United States Patent [19]
Hood

[11] Patent Number: 5,185,950
[45] Date of Patent: Feb. 16, 1993

[54] FISH TROLLING DEVICE

[76] Inventor: Edwin I. Hood, P.O. Box 417, Baker City, Oreg. 97814

[21] Appl. No.: 813,212

[22] Filed: Dec. 23, 1991

[51] Int. Cl.⁵ ............................................. A01K 91/00
[52] U.S. Cl. ..................................... 43/19.2; 43/26.1; 43/43.11
[58] Field of Search ............... 43/26.1, 26.2, 43.11, 43/19.2, 43.13, 27.2, 27.4, 43.12

[56] References Cited

U.S. PATENT DOCUMENTS

| | | | |
|---|---|---|---|
| 798,344 | 8/1905 | Holz et al. | |
| 2,643,478 | 6/1953 | Paulsen | 43/19.2 |
| 3,031,790 | 8/1960 | Duryea | 43/19.2 |
| 3,466,787 | 7/1967 | Collins | 43/43.13 |
| 3,623,259 | 7/1968 | Rode | 43/19.2 |
| 3,645,030 | 2/1972 | Milburn | 43/26.1 |
| 4,068,401 | 1/1978 | Saitoh | 43/26.2 |
| 4,204,356 | 5/1980 | Smith | 43/26.1 |
| 4,312,147 | 1/1982 | Christiansen | 43/15 |
| 4,509,287 | 4/1985 | Hood | 43/19.2 |
| 4,798,021 | 1/1989 | Miklos | 43/26.1 |
| 4,903,428 | 2/1990 | Sluiter | 43/26.1 |
| 4,974,358 | 12/1990 | King | 43/26.1 |

FOREIGN PATENT DOCUMENTS 231031 2/1944 Switzerland .

OTHER PUBLICATIONS

Exhibit A, drawing of trolling device sold by applicant more than 1 year prior to the filing date of the present application.
Exhibit B, photograph of device described in Exhibit A.

Primary Examiner—Kurt C. Rowan
Attorney, Agent, or Firm—Klarquist, Sparkman, Campbell, Leigh & Whinston

[57] ABSTRACT

A trolling device for a fishing lure includes a frame to be towed through water. A spool on the frame has a length of fishing line for connection to a fishing lure. A drive means driven by the force of water as the frame is towed through water causes the line to wind upon the spool. The drive means is periodically disengaged to allow the spool to freewheel and the line to unwind. Thus, the lure will alternately accelerate toward the frame and drop back from the frame as the frame is towed through water. A selectively operable pause means is provided to delay retrieval of a lure toward the frame for a predetermined period of time, and further means are provided to disengage the drive means from the spool upon application of excessive force to the towing line.

8 Claims, 5 Drawing Sheets

FISH TROLLING DEVICE

FIELD OF THE INVENTION

The present invention relates to a trolling device, and more particularly, to a device to give motion to a fish lure making the lure more attractive to salmon.

BACKGROUND OF THE INVENTION

Much effort has been expended to develop an action to a trolled lure for salmon that will increase the catch volume. It has been observed that, on a vessel where salmon are fished for by trolling lures behind the boat, the frequency of hook-ups on the lures increases when the boat makes sharp turns in the water. Usually several lures are trolled behind a boat from outriggers, some from each side of the vessel. The speed of the lures on the outside of the turn is accelerated, while those lures on the inside of the turn are decelerated to the point of stopping almost entirely in the water. Because of the loss of forward motion, the inside lures flutter or drop through the water simulating wounded bait fish. Thus, it is believed that the speed the lure is trolled through the water is critical in enticing a salmon to bite. However, because of weather conditions and the proximity of adjacent fishing boats it is difficult to maneuver a boat to make such turns.

It is not known exactly why salmon will strike lures as they go through their various actions. It is known that salmon appear to strike and attack bait or lures that simulate a wounded herring or similar bait fish. Consequently, sport fisherman have had success by alternately accelerating a lure and allowing it to fall back from a boat. Typically, a commercial salmon fisherman will troll several lures from a downrigger. As a result, it is not feasible for a troller to attempt to accelerate a bait and let a bait drop back by pulling in and releasing lines.

My prior U.S. Pat. No. 4,509,287 related to a device that would cause a lure's speed alternately to increase and to decrease as the lure was trolled through the water. The subject invention seeks to provide certain improvements thereto.

Other devices have been devised heretofore to impart the action to a bait or lure.

In U.S. Pat. No. 798,344, to Holz, et al., motion is imparted to a lure by a spring motor-driven propeller.

In U.S. Pat. No. 2,643,478 to Paulsen, an ice-fishing device is shown in which an arm is elevated and lowered by a motor to lift and drop a bait.

U.S. Pat. No. 3,031,790, to Derea, shows a somewhat similar bait-jigging device.

U.S. Pat. No. 3,645,030 to Melburn shows a bobber with a motor-driven device to jig a bait suspended below the bobber.

U.S. Pat. No. 4,204,356, to Swift, shows a trolling device having a reciprocating arm mounted on a wheel that is rotated by the motion of the boat through the water. The reciprocation of the arm causes a bait attached to the arm to be moved forwardly and dropped back relative to the motion of the trolling device.

U.S. Pat. No. 4,312,147, to Christensen, also shows an arrangement for jigging squid bait in which the line is retrieved into a rotating drum.

SUMMARY OF THE INVENTION

The present invention comprises a device adapted to be towed under water from a downrigger on a boat. A fish lure is trolled behind the device, the action of the device being such as first to accelerate the lure and then to permit it to drop back relative to the motion of the trolling boat. The device includes a frame on which is mounted a spool. A leader line is wound on the spool for connection to a fishing lure that trolls behind the device. An impeller is positioned on the frame so as to be driven by the flow of water past the device as it is towed. Means are provided to drive the spool at selected times by the impeller. A triggering mechanism is provided for selectively connecting and disconnecting the spool to the impeller. The trigger is operated by means associated with the line when a predetermined amount of the line has been played off from the spool or alternatively, retrieved. The operation of this triggering means will cause the spool to be driven by the impeller so as to rewind the line until a predetermined amount of the line is rewound on the spool when the triggering system will again be actuated to disengage the spool from the impeller and permit the line to be withdrawn from the spool. Thus, the lure is first pulled through the water at a fast rate of speed as the line is wound on the spool and thereafter allowed to fall back in the water as the spool freely rotates and the line plays out due to the friction of the drag of the lure and the line in the water. The alternating rapid acceleration and substantially motionless action of the lure is attractive to fish and will enhance the catch over a given period of time.

The device of the present invention includes a line pause mechanism. This feature makes it possible to select a lure behavior that consists of the following repeated sequence: towing the lure at its normal speed for a short period, accelerating the lure forward for a short period, and releasing the lure to fall back before repeating the sequence. The pause mode is interchangeable with the constant repeating mode described above, and either mode can be user selected by a single operation.

A further feature of the present invention is a reverse load release mechanism. This feature serves to protect the means for driving the spool from damage when an excessive reverse force is applied to the fishing line. The driving means may be subjected to such an excessive force when a hooked fish fights directly against the device with its driving means engaged for accelerating the lure. The reverse load release mechanism is triggered by an excessive force to disengage the driving means from the spool.

Yet another feature of the present invention is its ease of use. The trolling device has been provided with means to allow for easy adjustment of the stroke or length of line reeled in and released during the jigging operation. Also, a release clip may be provided at the end of the device's leader line for attachment of a sport leader. Additionally, a line lock lever is provided to lock the driving means for stowing the line when not in use. Further, a holder may be attached to the boat's cap rail to secure the device while rigging it for use. These features serve to simplify operation of the device.

The trolling device described herein can be used where a steady river or ocean current prevails by attaching it to a fixed buoy line. The current causes the mechanism to operate to first induce the spool to wind in line and thereafter to release it, giving action to the lure.

DETAILED DESCRIPTION OF THE PREFERRED EMBODIMENT

Figure 1:
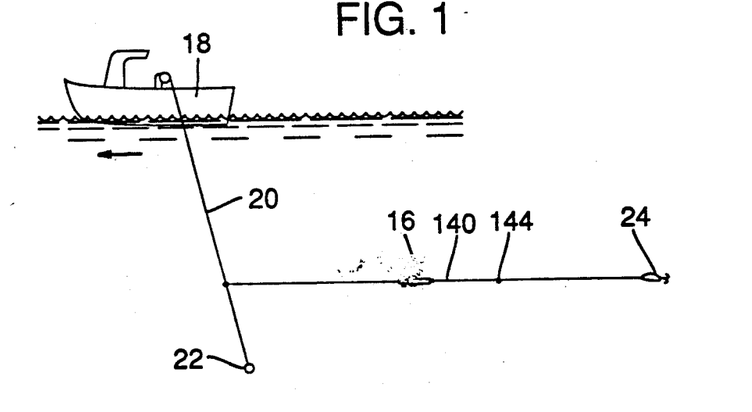
FIG. 1 is a schematic view showing how the device of the invention may be utilized in a downrigger trolling arrangement.
Figure 2:
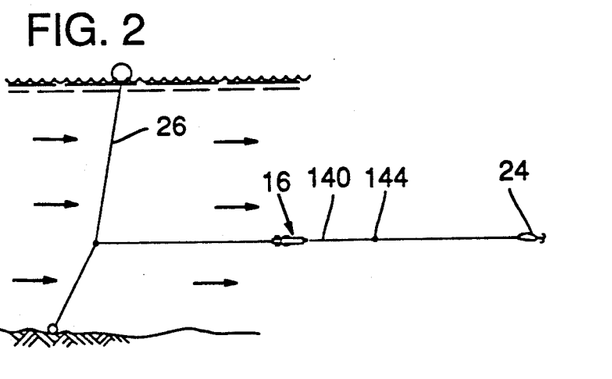
FIG. 2 is a view showing how such a device may be employed in a fixed location in a water current.

Referring first to FIG. 1, the trolling device 16 of the invention is adapted to be trolled through the water from a boat 18. It may be attached to a trolling wire 20 of a downrigger to the lower end of which is secured a heavy sinker 22. In this way the downrigger remains relatively vertical in the water as the boat moves through the water. The downrigger is periodically retrieved into the boat so as to capture any fish that may have been hooked on the lure 24 trailing from the device. A multiple number of devices 16 may be towed from a single downrigger. The device 16 can also be used with a single rod in combination with a downrigger as will later be explained. Alternatively, the device 16 can be used in a steady river or ocean current by attaching it to a fixed buoy line 26 as illustrated in FIG. 2. The steady current is sufficient to drive the device 16 to impart the desired motion to the lure 24.

Figure 3A:
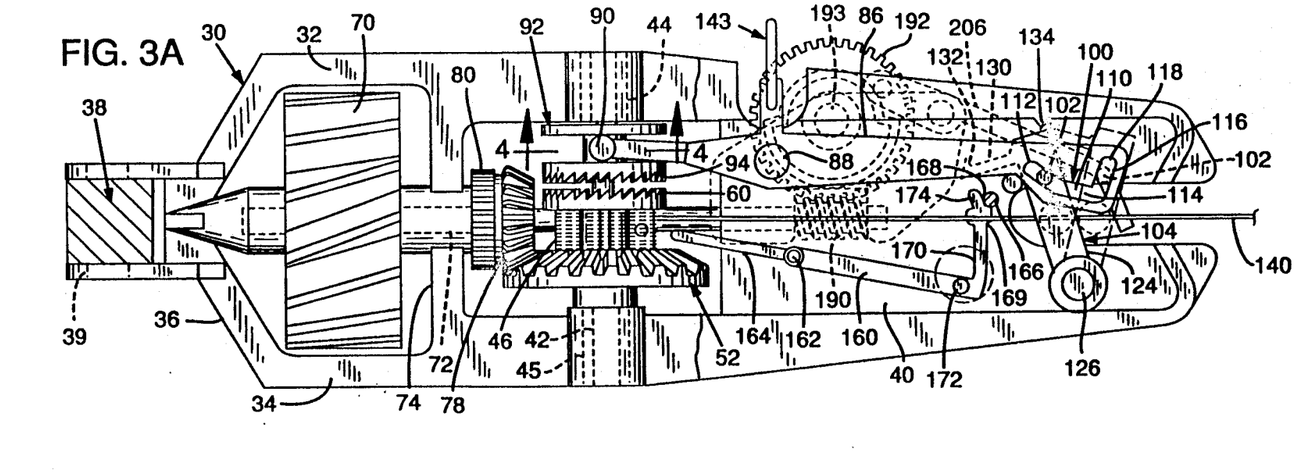
FIG. 3A is a top view of a trolling device constructed in accordance with the invention illustrating the position of various elements with the clutch disengaged and the lure being permitted to fall back, broken away to show details.
Figure 3B:
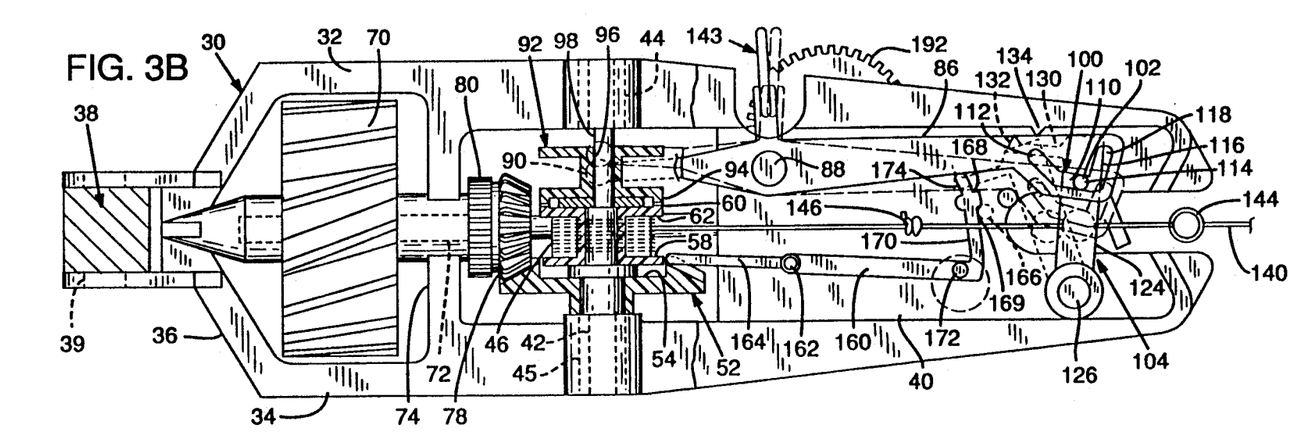
FIG. 3B is a further top view with the clutch engaged, the clutch and spool being shown in section; likewise being broken away to show details.

Referring now to FIGS. 3A and 3B, an the preferred embodiment of the invention comprises an elongate frame 30 consisting of two parallel side members 32, 34 and a tapered forward end 36. A release member 38 is attached on a pivot 39 at the forward end of the device for connecting the device to a downrigger wire and fishing line for towing as is described below. A housing 40 is mounted to and extends between the side members 32, 34 at the rearward end of the frame 30, see FIG. 6. Enclosed within the housing are shifting, triggering, and locking mechanisms which are described below.

Extending transversely between the side members 32, 34, forward of the housing, is a shaft 42 journalled in bushings 44, 45 located in holes in side members 32, 34 respectively. A line spool 46 is mounted upon the shaft and rotates independently thereof. A beveled driven gear 52 is mounted upon and fixed to the shaft 42 adjacent one side of the line spool 46. This gear is formed with a recess 54 on the side adjacent the line spool 46 to accept at least a portion of the spool's adjacent flange 58 as shown in FIG. 3B, thus, permitting use of a wider spool increasing line capacity. A toothed flat gear 60 is attached to the flange 62 of the line spool 46 opposite the flange 58. The toothed flat gear 60 is engageable with a clutch as will be explained below.

An impeller 70 is mounted toward the forward end of the frame 30 on a shaft 72. The shaft 72 is journalled in a cross-frame member 74 and extends longitudinally of the frame 30. A beveled drive gear 78 is mounted on the opposite end of the shaft 72 and engages the beveled driven gear 52. Forward of beveled drive gear 78 is a wheel gear 80, also shown in FIG. 6, which powers the device in its pause mode as described in detail below.

Clutch means are provided to effect engagement and disengagement of the line spool 46. Pivotally mounted within the frame housing 40 near frame side member 32 is a shift lever 86 which is secured to the frame housing 40 by a pivot pin 88, the opposite ends of which are secured in the housing 40. On the forward end 89 of the shift lever is a rounded tip 90 adapted to engage the clutch means. The shift lever pivots between two positions to shift the clutch into engagement in a first position and out of engagement in a second.

Figure 4:
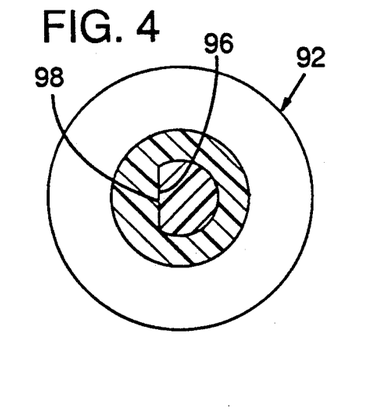
FIG. 4 is an enlarged section along line 4—4 of FIG. 3A showing the clutch spool.

The clutch means includes a clutch spool 92 mounted on the shaft 42 so as to be driven therewith but shiftable axially of the shaft by the shift lever 86 between an engaged and a disengaged position. The rounded tip 90 of the shift lever engages the clutch spool 92 between the flanges thereof to axially shift the clutch spool as the shift lever is pivoted. The clutch spool 92 is provided with a toothed gear 94 adapted to engage the gear 60 on the adjacent line spool flange 62 when the clutch spool is shifted axially on the shaft to the engaged position. When shifted to the disengaged position, the clutch spool is moved on the shaft away from the line spool 46 to disengage the gears 60 and 94. Referring to FIG. 4, the clutch spool 92 has a flat 96 on its shaft bore that matches a flat 98 on the shaft 42 so the shaft and clutch spool rotate with the driven gear 52.

The rearward end of the shift lever 86 is provided with a cam slot 100 in which is engaged a pin 102 extending from a trigger 104. The trigger 104 has three operative positions. In FIG. 3A, the trigger 104 is depicted in its clutch disengaged position. The cam slot 100 has an obtuse-angled portion 110 in which the pin 102 is shifted by the trigger 104 between two positions, a clutch disengaged position wherein the pin is adjacent the forward end 112 of the obtuse angled slot portion 110 as shown in FIG. 3A, and a clutch engaged position wherein the pin 102 is at a position 114 near the opposite end of the obtuse angled slot portion 110 just short of an upwardly angled slot portion 116. The third and last position of the pin 102 at the rearward end 118 of the upwardly angled portion 116 is utilized in operation of a reverse load release mechanism to be described below.

The trigger 104 includes an arm portion 124 which is pivotally mounted within the frame housing 40 adjacent the frame side member 34 near the rearward end thereof by a pivot pin 126, the opposite ends of which are secured in the housing 40. Clockwise movement of the trigger 104 about the pivot 126 from the position shown in FIG. 3A, will cause the pin 102 to slide through the cam slot 100 to rotate the shift lever 86 in a counter-clockwise direction and shift the clutch spool 92 into engagement with the line spool 46. In this movement, the pin 102 will slide from the forward end 112 of the cam slot portion 110 to a position indicated at 114.

The trigger 104 has a finger 130 with a barbed end 132 that engages a stop 134 on side member 32 when the clutch is in its engaged position. When the barbed end 132 is in abutment with the stop 134, the trigger pin 102 has moved rearwardly in the cam slot 100 to the position 114 therein to lock the clutch teeth 94 into engagement with the toothed flat gear 60. The barb 132 and stop 134 operate to prevent the trigger pin 102 from entering the upwardly angled slot portion 116 in normal operation.

Referring to FIG. 3A, connected to, and adapted to be wound on, the line spool 46 is a trolling line 140 which extends through an opening 142 (see FIG. 9) in the trigger arm 124 large enough to permit the line to move freely therethrough. When the clutch is in its engaged position, the line spool 46 rotates with the shaft 42 to wind in the line 140 onto the line spool. When disengaged, the line spool rotates freely, permitting the line to be drawn out.

A pressure vane 143 is fixed to and extends laterally of the shift lever 86 opposite the pivot 88. When the clutch gears 60, 94 are engaged to retrieve line, the pressure of the water against this vane urges the lever 86 clockwise to press the lever against the pin 102 to prevent it from sliding forwardly in cam slot 100, and thereby holding the lever in the clutch engaged position. Without this constant force, the drag of the line 140 being rewound on the line spool 46 would tend to pivot the trigger 104 counterclockwise so that the shift lever 86 would effect disengagement of the clutch prematurely. Similarly, the force of water against the vane 143 serves to hold the trigger 86 in the clutch disengaged position against the drag of line being unwound from the spool.

The line 140 has positioned thereon two line stops. A first line stop, 144, is near the free end of the line. A second line stop, 146, is fixed to the line forward of the stop 144 and the trigger arm 124 at a distance along the length of the line 140 from the line end attached to the spool slightly greater than the distance between the line spool 46 and the rearward-most position of the trigger arm 124. The stops 144, 146 are of larger diameter than the width of the line opening 142 in the trigger arm 124 to prevent movement of the stops through the line opening.

Figure 5:
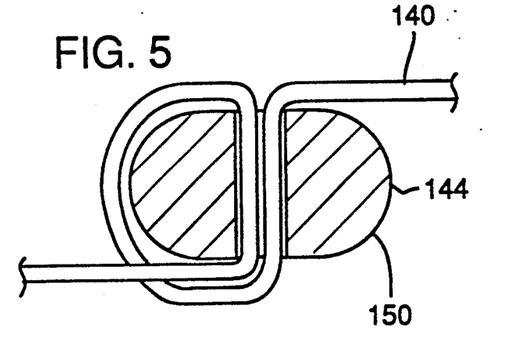
FIG. 5 is an enlarged cut-away view of a drilled bead utilized for stroke adjustment.

The second stop 146 may conveniently be formed by knotting a short length of line at that position. The stop 144, however, preferably comprises an adjustable stop such as a diametrically drilled bead 150 through which the line 140 may be looped as shown in FIG. 5. Use of a drilled bead 150 as the stop 144 permits easy adjustment of the bead position and consequently allows easy adjustment of the stroke or length of line reeled in by action of the device.

Adjustment of the bead is accomplished by holding the line with one hand while pushing the bead away with the fingers of the other hand. Thus, the spacing between the line stops 144, 146 may be varied as the user selects from a few inches to many feet. The reaction of fish seems to vary from day to day and even from hour to hour. Consequently, the fall back or dwell period of the lure as the line spool 46 turns freely is variable to allow enhancement of a fish strike by changing stop positions.

Assuming a condition wherein the gears 94 and 60 are engaged as shown in FIG. 3A to rotate the line spool 46, the line 140 will wind in. When the line stop 144 engages the trigger 104, it will pivot the trigger counterclockwise causing the shift lever 86 to pivot in the clockwise direction disengaging the clutch gears 94 and 60 as shown in FIG. 3B thus freeing the line spool 46. The drag of the water on the lure will then cause the line 140 to be withdrawn from the spool until line stop 146 engages the trigger 104 pivoting it clockwise until the trigger barb 132 engages the trigger stop 134. This action of the trigger 104 rotates the shift lever 86 counterclockwise to shift the clutch spool 92 into engagement with the line spool 46. This will once again cause the clutch mechanism to be engaged so that the line spool 46 is driven to retrieve the line 140. When line stop 144 again engages the trigger bar 104 to effect shifting of the lever 86 to its opposite position the clutch is disengaged and the spool 46 will once again be free wheeling. As a result, the lure 24 will alternately be moved toward the device 16 and then be released to fall back and move relatively slowly, fluttering in the water. This darting lure action is somewhat duplicative of wounded bait fish which salmon seem most readily to pursue. Thus, such lure action enhances the probability of a salmon or other fish striking the trolled lure.

Referring again to FIGS. 3A and 3B, the trolling device 16 is also provided with a line lock lever 160 pivotally mounted within the housing 40 on pivot 162 which allows movement of the lock lever between two positions. The lock lever 160 has a gear lock finger 164 adapted to engage the teeth of the driven gear 52 and block its movement when the lock lever is in its engaged position, shown in FIG. 3B. To hold the lock lever 160 in its alternate positions, a catch pin 166 protrudes from the frame housing 40 for engagement with one side 168 or the other side 169 of a protrusion formed on a catch finger 170 extending at a right angle from the lever. A pin 172 is provided on the lock lever 160, near the catch finger 170, extending at a right angle from the lock lever outwardly through a hole in the housing to permit a user to manually pivot the lever 160 between engaged and disengaged positions. When the lock lever 160 is pivoted counterclockwise into its engaged position, the pin 166 is engaged on protrusion side 169 and the gear lock finger 164 engages the teeth of the driven gear 52, blocking its movement.

At the same time, a tip 174 of the catch finger 170 engage the shift lever 86 to pivot the shift lever counterclockwise, thereby engaging the clutch teeth 94 and flat gear 60 of the line spool 46. In this manner, with the line spool 46 engaged by means of the clutch 4 to the rotation of the shaft 42 and with rotation of the shaft blocked by engagement of the gear lock finger 164 with the teeth of the driven gear 52, rotation of the line spool is thereby also blocked.

When the lever 160 is pivoted clockwise, the finger 164 is pivoted away from the gear 52 so that it is free to rotate. Also, the tip 74 of the finger 170 will no longer engage the shift lever 86, allowing movement of the shift lever between clutch engaging and clutch disengaging positions. The pin 166 engages on protrusion side 168 in this position of the lever 160.

Figure 6:
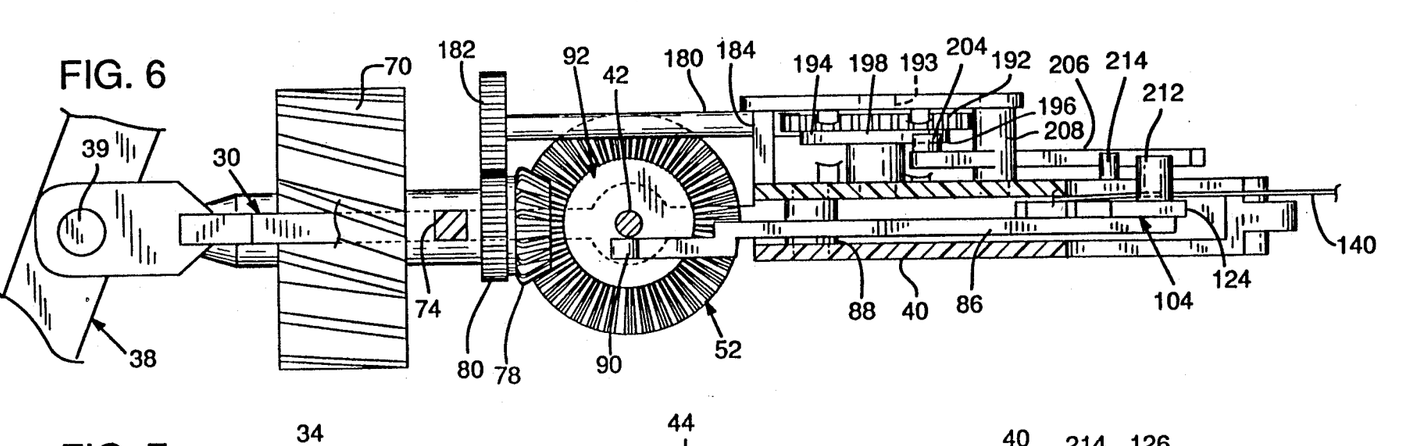
FIG. 6 is a view partly in section taken along line 6—6 of FIG. 7, showing the pause mechanism.
Figure 7:
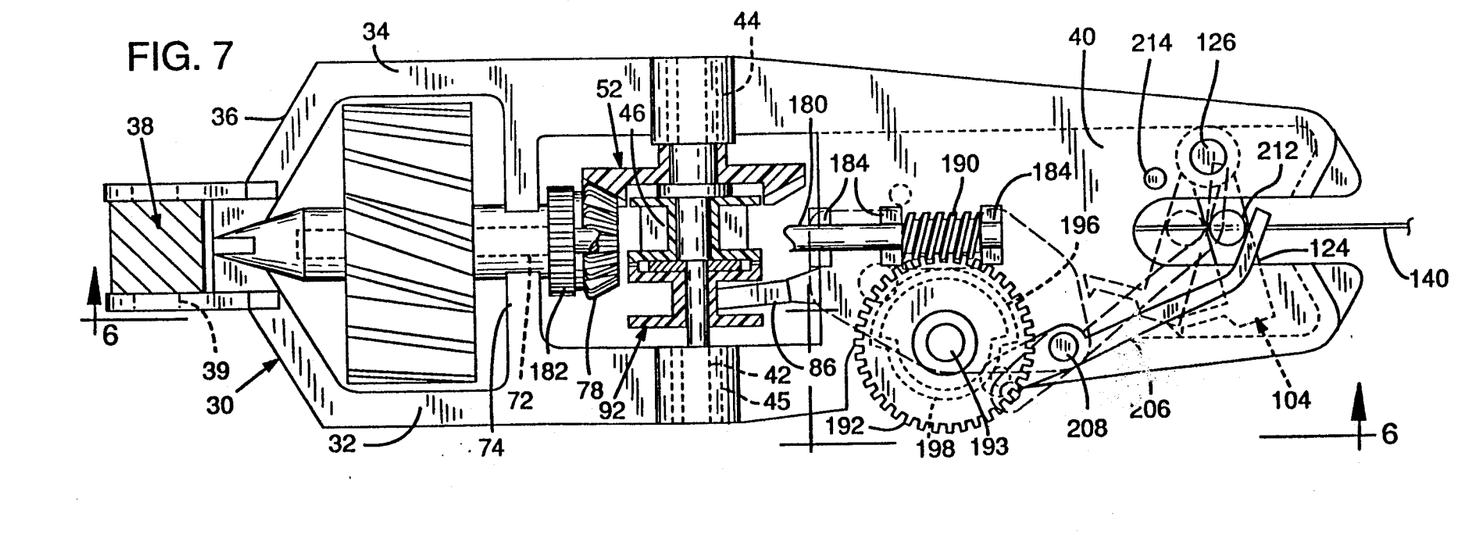
FIG. 7 is a bottom view partly in section of the device of FIG. 3A, showing the pause mechanism.

Referring now to FIGS. 6-7, the device of the present invention may include a line pause mechanism. This feature makes it possible to select a lure behavior that alternates towing the lure at its normal speed for a short period with the previously described acceleration of the lure ahead over a short distance and release of the lure to fall back to normal towing position. The pause mode, when provided, is interchangeable with the constant repeating mode described above, and either mode can be user selected by a single adjustment.

Referring to FIGS. 6 and 7, mounted on one end of a shaft 180 is a driven gear 182 which engages the wheel-gear 80. The shaft 180 is journalled in a bushing 184 that is mounted to the housing 40 parallel to the axis of the shaft 180. Mounted on the end of the shaft 180 opposite the gear 182 is a worm gear 190. A gear 192, driven by the worm gear, is rotatably mounted on a pin 193 on the exterior of the frame housing 40. Secured to the gear 192 to rotate therewith is a timer means comprising a cam 194 having a high lobe 196 and a low lobe 198. The cam lobes 196, 198 are engaged by a cam follower pin 204 mounted on a pause lever 206. The pause lever 206 pivots on a pivot pin 208 mounted to the exterior of the frame housing 40. The opposite end of the pause lever 206 is adapted in the operative stage of the pause mode, flexibly to engage a pin 212 projecting from the trigger arm 124. When the high lobe 196 engages the cam follower pin 204, the pause lever 206 is urged against the trigger pin 212 with sufficient force as to pivot the trigger arm 124 forwardly causing the clutch lever to disengage gears 60, 94 releasing the line spool 46. This allows the line to pay out until the stop 146 engages the trigger arm 124. Because trigger arm 124 is urged forwardly by the pause lever 206, it will not shift rearwardly to re-engage the clutch gears 60, 94 whereby the lure 18 will be allowed to trail at the speed of the towing boat until the end of high lobe 196 is reached and the low lobe 198 rotates into contact with the cam follower pin 204. This permits the pause lever 206 to pivot clockwise relieving pressure on the trigger pin 212 and permitting the trigger 104 to pivot from the force of the towed lure to reengage the clutch and rewind the line 140. Thus, the lure will continuously and alternately accelerate toward the frame, drop back from the frame, pause at the same position relative to the frame for a short time, and then accelerate again toward the frame as the device is towed through water. To render the pause mechanism inoperative, the pause lever 206 is lifted over the trigger pin 212 and engaged behind a pin 214 projecting from the frame housing 40.

The pause mechanism, in effect, periodically interrupts the operation of the trigger 104. During the periodic time interval that the trigger is rendered inoperative by the pause mechanism, the lure is towed at a constant distance from the trolling device 16. When periodically rendered operative, the trigger 104 causes the lure to alternately accelerate forward and fall back. During the time interval in which the trigger 104 is operative, the sequence of accelerating forward and falling back may be repeated one or more times depending on the length of the stroke. As described above, the stroke is set by adjusting the position of stop 144 o line 140. By lengthening the stroke sufficiently, the accelerating and falling back sequence will be repeated only once during the time interval that the trigger is operative. Thus, with a sufficiently lengthened stroke, the pause mechanism provides a lure behavior consisting of the repeated sequence: towing the lure at its normal speed for a short period, accelerating the lure forward for a short period, and releasing the lure to fall back before repeating the sequence.

Figure 8:
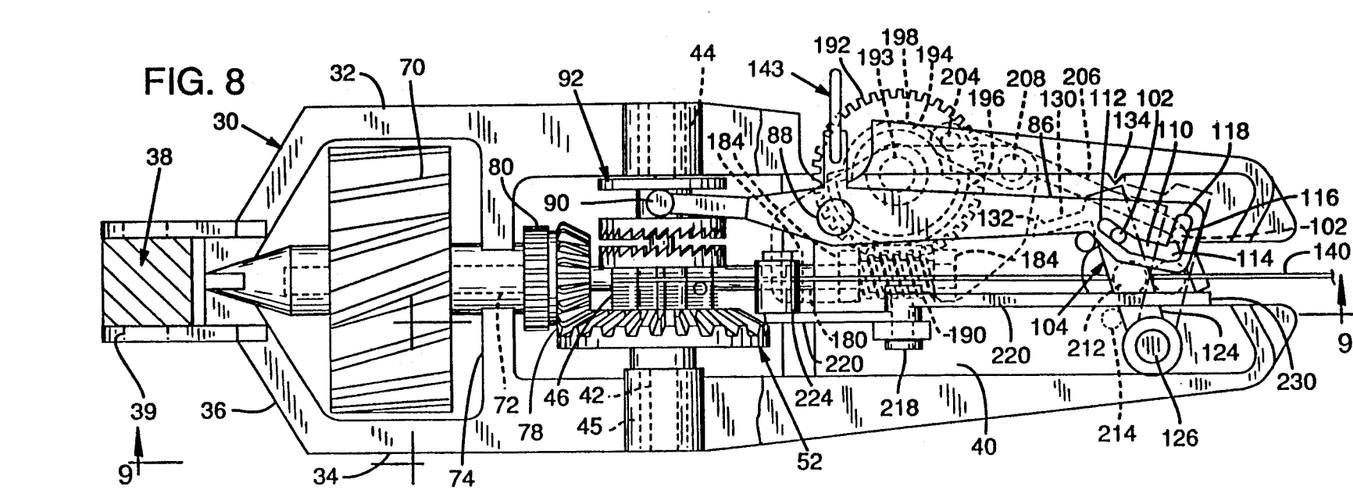
FIG. 8 is a top view of the device with the load release mechanism shown.
Figure 9:
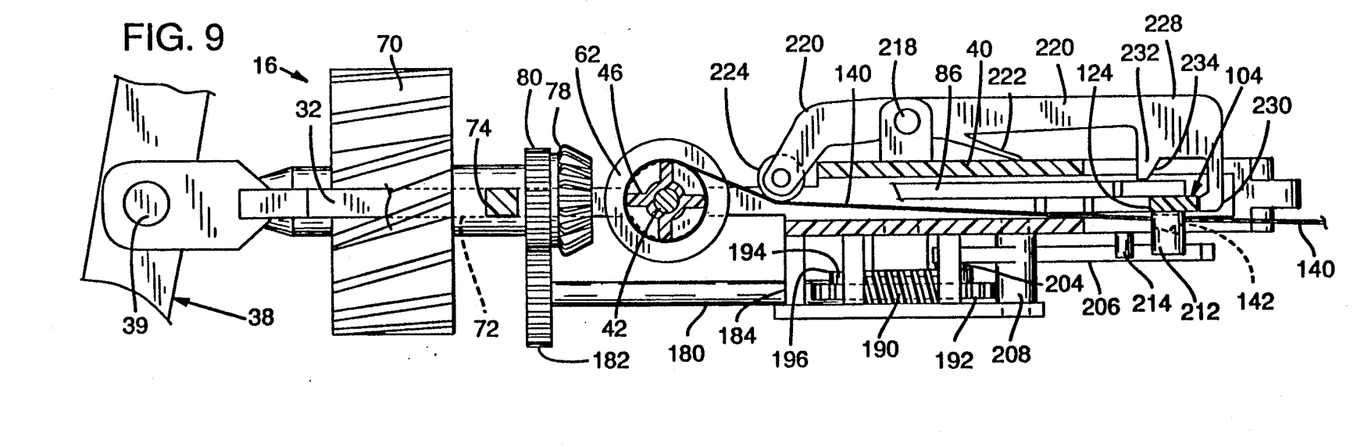
FIG. 9 is sectional view taken along line 9—9 of FIG. 8.

Referring now to FIGS. 8 and 9, a reverse load release mechanism to protect the power train is shown. Pivotally mounted to the exterior of the frame housing 40 by a pivot pin 218 is a load lever 220 extending longitudinally of the device and biased in the counterclockwise direction by a spring 222 interposed between the load lever and the housing. The forward end of the load lever 220 is provided with a roller 224 which engages and provides tension to the line 140 forming a bight therein under the force of the spring 222 under normal lure towing conditions.

The load lever 220 has a depending arm 228 which extends downwardly along the trigger 104 but is positioned so as to be spaced therefrom during normal lure towing conditions. A tapered finger 230 extends beneath the trigger 104. Also depending from the load lever 220 is a wedge shaped element 232 having a wedge face 234. It will be recalled that when the clutch 92 is engaged, the trigger pin 104 is in its clutch engaged position with the pin 102 at the position 114 in the obtuse angled cam slot portion 110 just short of the upwardly angled portion 116. In this position, the trigger 104 rests against the tapered finger 230 of the load lever, as shown in FIG. 9.

When line 140 is straightened by a pull sufficient enough to overcome spring 222, force is imparted to the load lever 220 to cause it to rotate clockwise about the pivot pin 218. This causes the wedge face 234 to engage the trigger 104 forcing it to pivot rearwardly past the stop 134 and bringing trigger pin 102 into alignment with the upwardly angled cam slot portion 116. Water flow pressure on the vane 138 will cause the lever 220 to rotate clockwise until trigger pin 102 arrives at the rearward end 118 of the upwardly angled cam slot portion 116, see FIG. 8, thereby completely disengaging the clutch 92. To reset the mechanism for normal functioning, the load lever 220 must be manually rotated counterclockwise back to its original position. As the load lever is forcibly rotated counterclockwise, the finger 230 will rotate the trigger 140 and shove the trigger barb 132 back past the stop 134 and return the trigger pin 102 to the position 114 in the obtuse angled cam portion 110 re-engaging the clutch. Normal functioning continues thereafter.

Figure 10:
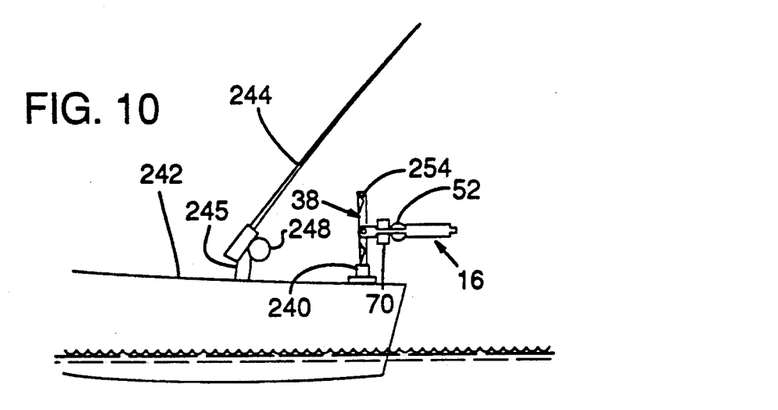
FIG. 10 shows the device of FIG. 3A secured in a holder attached to a boat rail.
Figure 11:
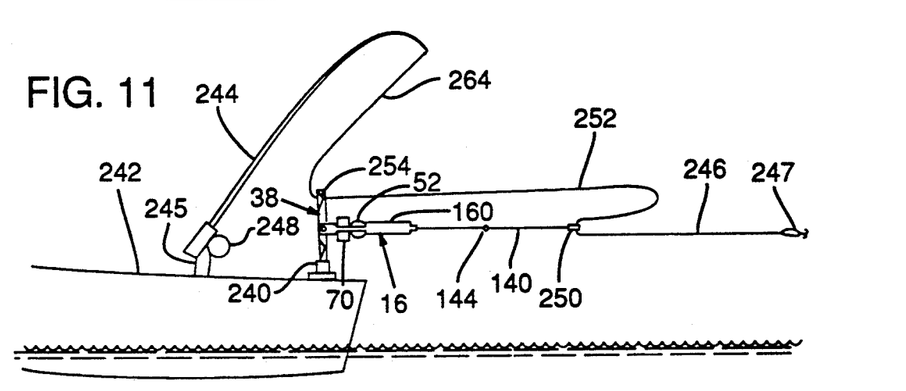
FIG. 11 illustrates how the device of FIG. 3A may be rigged for operation.
Figure 12:
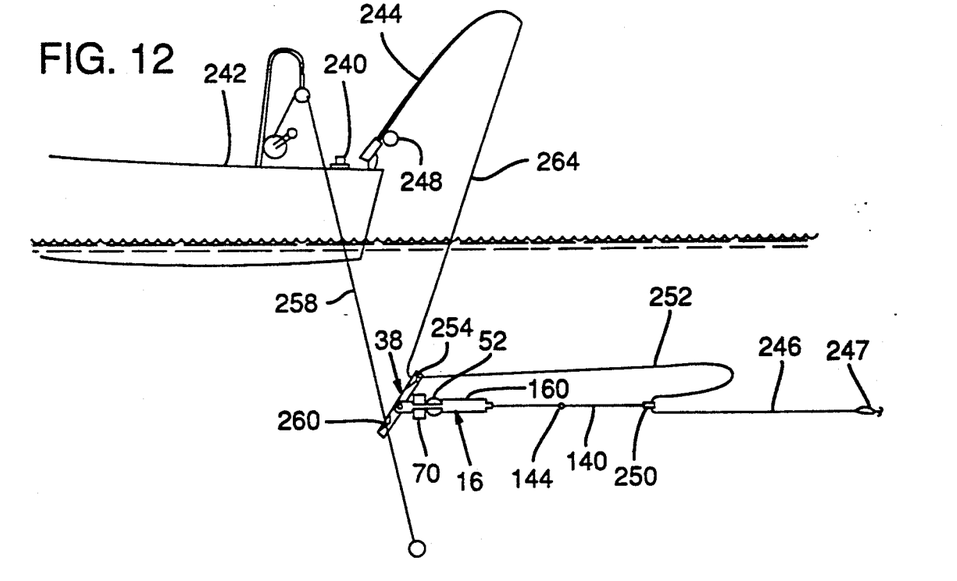
FIG. 12 shows the device of FIG. 3A fully deployed.

FIGS. 10-12 illustrate the preparation of the lure towing device 16 for use with a downrigger and fishing rod. To aid in use of device 16, a base holder 240 is fastened to a boat rail 242 to firmly hold the device 16 by the release member 38. A fishing pole 244 is secured in a pole holder 245 attached to the boat rail 242. The line lock lever 160, FIG. 3A, is disengaged from gear 52 to release the line 140 The position of the line stop 144 on the trolling line 140 is adjusted to set the desired length of stroke. After attaching a lure 247, the desired amount of leader 246, to be trailed behind the device, is pulled off a reel 248 on the fishing pole 244. A pressure type gripper clip 250 on the end of the line 140 is manipulated to grasp leader 246. All of the line 140 on the spool 46 is allowed to pay out, with an additional amount of leader 252 pulled off of the reel 248 so slack is left after clipping the leader to a leader holding clamp 254 on the release member 38. Drag on the reel 248 is set to light so line may be pulled out relatively easily in the next step.

With reference to FIG. 12, the device is then removed out of the holder, clipped to the downrigger wire 258 with a downrigger clamp 260 on the release member 38, and lowered to the desired depth. Drag on the reel 248 is then tightened to a desired setting and the fishing line 264 is wound in so that it is taut. The device is now fully deployed to impart motion to the lure. When a fish strikes the lure 247, the leader 252 will be pulled out of the clips 250 and 254 so that the fish may be played directly from the pole 244.

When used for commercial trolling the trolling device 16 can be attached by suitable means to the downrigger 258 and the lure attached directly to the line 140 as shown in FIG. 1. If a fish is hooked, it can be retrieved to the boat by retrieving the downrigger.

Having described the invention in what is considered to be a preferred embodiment thereof, it is understood that the invention permits of modification in arrangement and detail. I claim as my invention all such modifications as come within the true spirit and scope of the appended claims.

I claim:

1. A trolling device for a fishing lure comprising:
   a frame adapted to be towed through a body of water;
   a spool rotatably mounted on the frame and a length of fishing line connected at one end to the spool and adapted to be wound thereon;
   the fishing line trailing from the frame as the frame is towed, and adapted to be connected to a fishing lure;
   drive means adapted to be driven by the force of water as the frame is towed therethrough for alternately engaging with and driving the spool to cause the line to wind upon the spool, and thereafter disengaging from said spool to permit the spool to reverse its rotation to allow the line to unwind; and
   pause means operatively connected to said drive means and comprising a timer means including a rotating cam and adapted to be driven by the force of water as the frame is towed therethrough, and means operatively connected to said timer means for maintaining said drive means in disengagement from said spool for a predetermined period of time after the line has unwound from said spool, and for effecting re-engagement of said drive means with said spool after said predetermined time whereby said line will cycle in a sequence comprising accelerating toward the frame, dropping back from the frame, and maintaining a set distance from the frame for a predetermined period of time, and thereafter accelerating toward said frame again to recommence the cycle.

2. A trolling device for a fishing lure as recited in claim 1, including means operatively connected to said pause means for selectively rendering the same operable or inoperable.

3. A trolling device for a fishing lure as recited in claim 1, including a reverse load release means actuated by an excessive pull on the fishing line for disengaging the drive means from the spool to protect the drive means when a force in excess of a predetermined amount is applied to said fishing line.

4. A trolling device for a fishing lure comprising:
   an elongate frame having means at a forward end thereof for connecting the frame to a towing line;
   a transversely extending shaft mounted on the frame;
   an independently rotatable spool mounted on the shaft;
   clutch means mounted on the shaft for rotation therewith but slidable axially of said shaft;
   clutch shifting means mounted on the frame and adapted to engage the clutch means to shift the same axially of said shaft; between a first position adjacent said spool and a second position spaced from said spool;
   propulsion means mounted on the frame adapt to be driven by the motion of the device as it is towed through water;
   means operatively connecting said propulsion means to said shaft to effect rotation of the latter;
   means on said spool for drivingly engaging said clutch means in the first position thereof;
   a towing line for towing a lure fixed at a first end to the spool and adapted to be wound upon the spool as the spool is driven by said clutch means;
   a second end of the towing line extending rearwardly from the frame as the frame is towed;
   said clutch shifting means comprising a shifting lever pivotally mounted on the frame, having a first end operatively engaging the clutch means and shiftable longitudinally of the shaft, and a trigger lever having a first end and a second end pivotally mounted by a first end on the frame near a trailing end of the frame;
   a cam slot in a second end of the shifting lever;
   a pin on the second end of the trigger lever engaged in said slot whereby pivoting of said trigger lever about said first end thereof causes the first end of the shifting lever to shift the clutch means between the first and second positions thereof;
   a first stop means positioned on said line between the trigger lever and the spool and a second stop means on the line positioned on the opposite side of the trigger lever whereby engagement of a stop with the trigger lever will effect movement thereof to pivot the trigger lever about the first end thereof.

5. A trolling device as recited in claim 1 wherein said lever means is mounted for movement of said second end to an inoperative position out of engagement with said clutch shifting means, and including catch means for releasably retaining said lever means in said inoperative position.

6. A trolling device as recited in claim 4 wherein the second stop means is a drilled bead attached to the towing line by looping the line twice through a hole in the bead whereby the position of the drilled bead on the line may be easily adjusted.

7. A trolling device as recited in claim 6 including a load release means for protecting the gearing means against an excessive loading force when the gearing means is engaged to drive the spool, comprising:
   a load lever having first and second ends pivotally attached to the frame medially of said ends, said first end operatively engaging the clutch shifting means such that in a first position of said lever the clutch shifting means is operative to engage and disengage the spool and such that in a second position of said first end the clutch shifting means is operative to disengage the clutch from the spool;
   said second end of the load lever being movable into and out of the path of said towing line;
   spring means interposed between said frame and load lever for applying a first force to hold the load lever in said first position, wherein said second lever end biases said towing line to form a bight therein, said lever means being pivoted to said second position when a second force is applied to said towing line sufficient to straighten the same and remove said bight whereby application of said second force will effect disengagement of the clutch means from the spool.

8. A trolling device as recited in claim 4 including a release clip attached to the second end of the towing line for attaching a sport leader.

* * * * *